United States Patent
Schumacher

(10) Patent No.: US 6,938,578 B2
(45) Date of Patent: Sep. 6, 2005

(54) DRINKING THROUGH AND METHOD OF CONVERTING SAME

(75) Inventor: Egon Schumacher, Bernstorf (DE)

(73) Assignee: Lubing Maschinenfabrik Ludwig Bening GmbH & Co., Barnstorf (DE)

( * ) Notice: Subject to any disclaimer, the term of this patent is extended or adjusted under 35 U.S.C. 154(b) by 97 days.

(21) Appl. No.: 10/282,788

(22) Filed: Oct. 29, 2002

(65) Prior Publication Data

US 2003/0084854 A1 May 8, 2003

(30) Foreign Application Priority Data

Nov. 2, 2001 (DE) .......................................... 101 53 595
Apr. 10, 2002 (DE) .......................................... 102 15 696

(51) Int. Cl.[7] .............................................. A01K 7/06
(52) U.S. Cl. ........................................ 119/75; 119/54
(58) Field of Search ........................... 119/74, 75, 72.5, 119/72, 54

(56) References Cited

U.S. PATENT DOCUMENTS

| | | | | |
|---|---|---|---|---|
| 1,743,719 A | * | 1/1930 | Louden et al. ................. | 119/75 |
| 2,845,046 A | * | 7/1958 | Hart ............................. | 119/75 |
| 3,357,406 A | * | 12/1967 | Robinsion .................... | 119/73 |
| 3,428,028 A | | 2/1969 | Hart | |
| 3,483,847 A | | 12/1969 | Kneubuehl | |
| 3,734,063 A | * | 5/1973 | Atchley ...................... | 119/72.5 |
| 3,750,706 A | * | 8/1973 | Mallinson ............... | 137/614.18 |
| 3,756,199 A | * | 9/1973 | Clark, IV .................. | 119/72.5 |
| 4,246,870 A | | 1/1981 | Gustin | |
| 4,338,884 A | * | 7/1982 | Atchley et al. ............. | 119/72.5 |
| 4,444,149 A | | 4/1984 | Shomer | |
| 4,538,791 A | * | 9/1985 | Wostal ........................ | 251/339 |
| 4,606,301 A | * | 8/1986 | Steudler, Jr. ................ | 119/72.5 |
| 4,637,345 A | * | 1/1987 | Hostetler .................... | 119/72.5 |
| 5,074,250 A | * | 12/1991 | Clark, IV ................... | 119/72.5 |
| 5,245,950 A | * | 9/1993 | Johnson ....................... | 119/72 |
| 5,339,768 A | * | 8/1994 | Schumacher ................. | 119/72 |
| 6,073,584 A | * | 6/2000 | Schumacher ................. | 119/72 |
| 6,308,657 B1 | * | 10/2001 | Schumacher et al. ......... | 119/72 |

FOREIGN PATENT DOCUMENTS

| | | |
|---|---|---|
| DE | 70 31 234 U | 12/1970 |
| DE | 88 04 053.4 U1 | 6/1988 |
| DE | 39 11 309 A | 10/1990 |
| DE | 91 01 513.8 U1 | 5/1991 |
| DE | 92 07 415.4 U1 | 8/1992 |
| DE | 42 03 451 A1 | 8/1993 |
| FR | 1 536 664 A | 8/1968 |
| WO | WO 00 51420 A | 9/2000 |

OTHER PUBLICATIONS

Copy of European Patent Office Search Report on Priority Patent Application (May 8, 2003).
Copy of German Patent Office Search Report on Priority Patent Application (Aug. 9, 2002).
Copy of European Patent Office Search Report on Priority Patent Application (Jul. 31, 2003).

* cited by examiner

Primary Examiner—Peter M. Poon
Assistant Examiner—T. D. Collins
(74) Attorney, Agent, or Firm—Technoprop Colton LLC

(57) ABSTRACT

Known drinking troughs with drinking valves (21), which are assigned to a water-supply line (20), and water-collecting bowls (24) assigned to said drinking valves are problematic when it comes to supplying young chicks automatically with water. Known drinking troughs have proven unsuitable for young turkey chicks. The invention proposes a drinking trough which is also suitable for young turkey chicks. This drinking trough is distinguished in that valve pins for opening the drinking valves (21) are assigned elongate, tubular actuating levers (25). The actuating levers (25) facilitate the opening of the drinking valves (21). Moreover, by way of the tubular actuating levers (25) extending into the water-collecting bowls (24), the water passing out of the drinking valves (21) is directed specifically into he water-collecting bowls (24), as a result of which splashing of water is avoided.

5 Claims, 9 Drawing Sheets

DRINKING THROUGH AND METHOD OF CONVERTING SAME

BACKGROUND OF THE INVENTION

1. Technical Field

The invention relates to a drinking trough for, in particular, poultry, such as turkeys, chickens, chicks or the like, having at least one drinking valve, which is assigned to a water-supply line and has a valve pin which can be moved in order to discharge water, and having at least one water-collecting bowl assigned to the respective drinking valve, and to a method of converting the drinking trough once the animals have reached a certain age by exchanging a water-collecting bowl with a limited water-accommodating capacity which is provided for young animals for a water-collecting bowl with a greater water-accommodating capacity.

2. Prior Art

Drinking troughs of the type mentioned here allow animals, in particular poultry such as, for example, turkeys, hens, geese, ducks and also the young of the aforementioned animals, to obtain automatically the water they require. For this purpose, the drinking trough has an elongate water-supply line, to which a plurality of drinking valves are preferably connected at regular intervals. Each drinking valve is assigned a water-collecting bowl. Water discharged by the drinking valve, to be precise in particular splashed water which is not drunk directly, accumulates therein. As soon as most or all of the water supply in the water-collecting bowl has been used up, the animals can preferably open a respective drinking valve for a short period of time directly, by means of their beaks or bills, and drink the water directly.

The known drinking troughs of the type described above have proven successful for the most part for chickens, chicks and broilers. The known drinking troughs, however, have not proven successful for breeding and fattening turkeys. In particular young turkeys, namely chicks, are often not capable of actuating the drinking valves directly. It is problematic for young turkeys to obtain fully automatically via drinking valves the water they require. Moreover, the problems concerning the soiling of the water-collecting bowls and the splashing of water are more pronounced in the case of turkeys than in the case of other animals.

The object of the invention, then, is to provide a drinking trough, and a method of converting the same, by means of which the problems concerning soiling and water splashing are avoided in a relatively reliable manner and by means of which turkeys in particular, to be precise also turkey chicks, can automatically obtain the water they require to a sufficient extent, preferably throughout the breeding and fattening processes.

BRIEF SUMMARY OF THE INVENTION

A drinking trough which achieves the object mentioned above is a drinking trough for, in particular, poultry, such as turkeys, chickens, chicks or the like, having at least one drinking valve, which is assigned to a water-supply line and has a valve pin which can be moved in order to discharge water, and having at least one water-collecting bowl assigned to the respective drinking valve, characterized in that the valve pin is assigned an actuating means. Since the valve pin which serves for actually opening and closing the drinking valve is assigned an additional actuating means, this facilitates the actuation, namely the opening and closing, of the drinking valve. This allows chicks in particular, to be precise in particular turkey chicks, to obtain the water they require to a reliable extent from the drinking trough according to the invention. The actuating means, at the same time, makes it easier for small animals to reach for the purpose of operating the drinking valve.

The actuating means is preferably assigned to the valve pin of the respective drinking valve such that, by virtue of the actuating means being moved, the valve pin can be moved into a position in which it allows water to be discharged. The actuating means may be configured to be larger than the valve pin, which usually only has a short actuating end projecting out of the housing of the drinking valve. The actuating means may form a kind of lever which is not only easier to reach for the animals, in particular small turkey chicks, but also allows easier movement of the valve pin. It is then sufficient in practice, for the purpose of opening the drinking valve, if the animals just touch the actuating means preferably by way of their beak, or bill, or head, in order to move the valve pin into a position in which the drinking valve is opened, that is to say in which the outflow of water is released.

According to a preferred configuration of the drinking trough according to the invention, the actuating means is of pivotable design. The actuating means can preferably be pivoted about a fixed pivot pin which runs horizontally and is arranged transversely to the longitudinal axis of an elongate water-supply line. The actuating means which can be pivoted in this way allows the drinking valve to be opened particularly easily. By virtue of the horizontally directed arrangement of the pivot pin transversely to the longitudinal direction of the water supply line, the actuating means can only be pivoted in opposite directions along an axis running longitudinally in relation to the water supply line. Longitudinal vibration of the water-supply line makes it possible, on account of this specific arrangement of the pivot pin, for the actuating means to pass automatically, namely as a result of gravitational force, into a position in which the drinking valve is opened. In the case of newly housed chicks, in particular turkey chicks, this makes it possible to fill simultaneously all water-collecting bowls immovably attached to the water supply line with a certain supply of water, thereby enticing the chicks to the drinking trough.

According to a preferred configuration of the invention, the pivot pin about which the actuating means can be pivoted is an integral constituent part of a mount, in particular of a clamping mount, by way of which the actuating means can be coupled to the water-supply line or also the drinking valve, or a mount of the valve, can be coupled to the water-supply line. The mount, which is preferably of releasable design, makes it possible for the actuating means to be removed, if required for replacement purposes, but in particular also when the poultry house is populated with older, stronger animals which can open and close the drinking valves without the actuating means and use the actuation of the drinking valve for reducing aggression. Such animals can possibly open the drinking valve further than is possible by the actuating means, with the result that, by virtue of the actuating means being removed, the water requirements of the animals, which increase as time progresses, can better be covered.

The actuating means is preferably designed as an actuating lever which has an elongate tube. Through this tube, liquid, in particular water, discharged by the drinking valve can pass specifically into the immovable water-collecting bowl. The tube directs the water from the drinking valve into the water-collecting bowl which is arranged below it and immovable with respect to the drinking valve, with the result that splashing of water is reliably avoided and it is no longer possible for the associated disadvantages to arise. For this purpose, the tube is preferably guided from the underside of the drinking valve into the vicinity of the base of the water-collecting bowl, which is preferably arranged vertically in a drinking valve. This makes it possible for a top end of the tube to be coupled to the actuating end of the valve pin of the drinking valve, said actuating end projecting downwards out of the housing of the drinking valve. As a result, when the actuating means is pivoted, the valve pin is also pivoted and the drinking valve is thus opened. The bottom end of the tube, said end being guided into the vicinity of the base of the water-collecting bowl, may serve to limit the pivoting angle of the actuating means because the water bowl is immovable relative to the actuating means, i.e. does not move with the movement of the actuating means because the water-collecting bowl is arranged in a fixed position below the water-supply line. This makes it possible to set the opening degree of the drinking valve in a measured manner. It is then only still possible for a certain quantity of liquid to pass out of the drinking valve per unit of time, as a result of which the risk of the water-collecting bowl overflowing is effectively avoided. If appropriate, the tube may be designed such that it can be shortened, for example by axial displacement, and the quantity of drinking water passing out of the drinking valve per unit of time can be changed, if required, for adaptation to the water requirement depending on the age of the animals.

A further drinking trough which achieves the object mentioned above, and which may also be a preferred development of the drinking trough having the features described above, is a drinking trough for, in particular, poultry, such as turkeys, chickens, chicks or the like, having at least one drinking valve, which is assigned to a water-supply line, and having at least one water-collecting bowl, which is assigned to the drinking valve and has a water-accommodating hollow which is open at the top, characterized in that the cross-sectional shapes of the water-accommodating hollow change along with the water level. By virtue of the cross-sectional shape or configuration which changes as the water level in the water-accommodating hollow changes, it is possible for the cross-sectional surface area of the water-accommodating hollow to increase disproportionately with the water level. As a result, as the water level, for example, doubles, the water-accommodating hollow can accommodate far more than double the quantity of water. This has the advantage for turkeys in particular, to be precise in particular turkey chicks, which are not yet sufficiently familiar with the actuation of the drinking trough, that, with the water-collecting bowl full, they can obtain the water they require without having to open the drinking valve by, for example, the actuating means. If the water level in the water-collecting bowl decreases, the residual water supply remaining in the water-collecting bowl becomes very small as a result of the then changing cross-sectional shape of the water-accommodating hollow. In particular, however, the change in cross-sectional shape of the water-collecting hollow allows the surface area of the water remaining in the water-collecting bowl to be limited to a small region around the bottom end of the tube of the actuating lever. If the animals, in particular chicks, want to peck out the rest of the water from the water-collecting bowl by means of their beaks, they inevitably reach the bottom end of the tube of the actuating lever, as a result of which the latter, on account of its smooth operation, opens the drinking valve and the water-collecting bowl is refilled. Opening of the drinking valve which is brought about in this manner takes place, as it were, inevitably, without the animals intending, or even noticing, it. In this way, there is more or less no need at all for newly housed chicks to become accustomed to the drinking trough, because the drinking valve is opened whenever the animals try to pick up the rest of the water from the water-collecting bowl.

The water-accommodating hollow is preferably designed such that it has an approximately circular cross section in the vicinity of its base, said circular cross section running concentrically in relation to the preferably likewise circular cross section of the actuating means. Said circular cross section in the base region of the water-accommodating hollow gradually changes, as the distance from the base region increases, into a differently shaped cross section, preferably an elliptical or oval cross section. In this case, the ratio of the long axis to the short axis of the elliptical or oval cross section increases in the direction of the top border of the water-accommodating hollow. In this way, the water-accommodating hollow, in the direction of the top border, achieves a comparatively elongate configuration, which provides the top region of the water-accommodating hollow with a comparatively large water-accommodating capacity.

The water-accommodating hollow achieves an approximately boat-like, elongate form as a result of the particular configuration according to the invention. The elongate water-accommodating hollow is arranged in a specific manner relative to the water-supply line. Accordingly, the elongate water-accommodating hollow is oriented longitudinally in relation to the water-supply line such that the longitudinal center axis of the water-accommodating hollow runs parallel to the longitudinal center axis of the water-supply line, the longitudinal center axis of the water-accommodating hollow preferably coinciding with an (imaginary) vertical plane which runs through the longitudinal center axes of the water-supply line and of the drinking valves connected thereto. In this way, the water-collecting bowl is located predominantly beneath the water-supply line, as a result of which the water-collecting bowl is also effectively protected against, in particular, the water located therein being contaminated. The elongate shape of the water-collecting bowl also allows self-cleaning of the same by the plumage of the animals.

Moreover, the disproportionately large increase in the volume of the water-accommodating hollow in the direction of the top border of the water-accommodating hollow results in an overflow of the water-collecting bowl being avoided because, for this purpose, the animals would have to keep the drinking valve open for a comparatively long period of time, which, as experience has shown, does not occur because the animals only come into contact with the actuating means or the actuating lever for a brief period. In addition, an overflow of the water-collecting bowl is prevented in that, by virtue of the specific configuration of the water-accommodating hollow according to the invention, the surface area of the water located in said hollow increases as the water rises increasingly, and thus moves away from the actuating lever, with the result that the animals are very much distracted from the actuating lever over time and thus no longer actuate the automatically closing drinking valve.

A method of achieving the object mentioned in the introduction is a method of converting a drinking trough which has at least one drinking valve, which is connected to a water-supply line, and at least one water-collecting bowl assigned to the drinking valve, characterized in that, once the animals have reached a certain age, a water-collecting bowl with a limited water-accommodating capacity which is provided for young animals is exchanged for a water-collecting bowl with a greater water-accommodating capacity. Accordingly, the drinking trough can be converted by virtue of the water-collecting bowl being exchanged. Thus, as the animals become older and they require more water, the water-collecting bowls with a smaller-accommodating capacity are exchanged for water-accommodating bowls with a greater water-accommodating capacity. This exchange can be carried out quickly and easily by the releasable fastening of the water-collecting bowl on, in particular, the water-supply line. All other components of the drinking trough, in particular the drinking valves, need not be changed.

It is preferable for the quantity of water passing out of the drinking valve per unit of time to be changed at the same time as the water-collecting bowl is exchanged.

Alternatively, it is also possible for the drinking through to be converted by the actuating lever, which is preferably releasably connected to the water-supply line or the respective drinking valve, being removed. Larger animals can then actuate the valve pin of the drinking valve directly, to be precise to the extent where it discharges larger quantities of water per unit of time than is possible if the drinking valve is opened by the actuating lever.

BRIEF DESCRIPTION OF THE FIGURES

A preferred exemplary embodiment of the drinking trough according to the invention and the method of converting the same are explained in more detail hereinbelow, with reference to the drawing, in which.

DETAILED DESCRIPTION OF THE PREFERRED EMBODIMENTS

Figure 1:
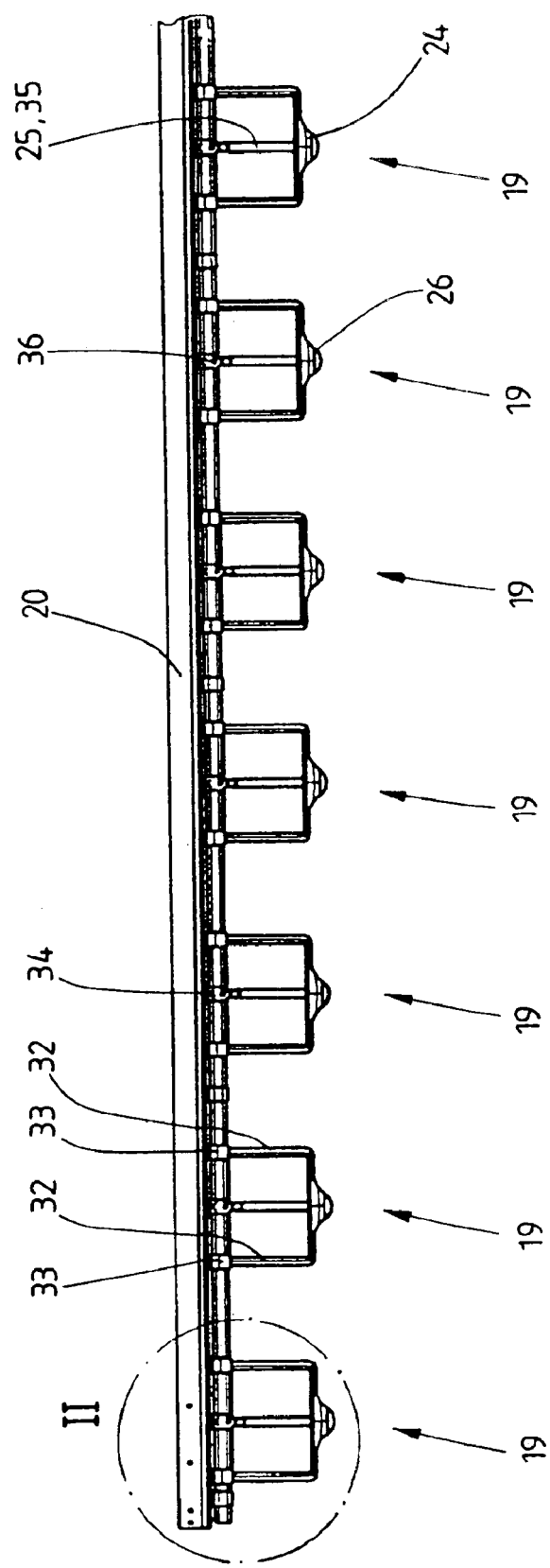
FIG. 1 shows a side view of part of the drinking trough (drinking element)

The drinking trough shown here is designed as an in-line drinking trough for the free-range management of poultry. The drinking trough allows all types of poultry, in particular also young animals (chicks) to obtain automatically the water they require. The drinking trough according to the invention is also suitable, in particular, for turkeys and turkey chicks.

The drinking trough shown in FIGS. 1 to 4 has an elongate, tubular water-supply line 20 with a plurality of spaced-apart drinking locations 19, all of the same design. The water-supply line 20 is arranged in a horizontally directed manner, on support cables (not shown), in a poultry house at an appropriate (small) distance from the ground. In the case of the drinking trough shown here, drinking valves 21 are screwed into the water-supply line 20 from beneath at regular intervals. These are drinking valves 21 which are known per se and have a partially externally threaded housing for screwing into corresponding threaded bores of the water-supply line 20. The drinking valves 21, which are preferably of the same design as one another, have a valve pin, which projects out of the housing 22 at the bottom by way of an actuating end 23. The respective drinking valve 21 can be opened by the valve pin being pivoted at least once from the actuating end 23, as a result of which water fed to the drinking valves 21 from the water-supply line 20 can flow out of the drinking valves 21 at the bottom in measured quantities. If actuation of the valve pin ceases, the drinking valve 21 closes automatically, as a result of which further flow of water out of the drinking valve 21 is interrupted.

Each drinking valve 21 is assigned a water-collecting bowl 24. The water-collecting bowls 24, which are preferably all of the same design, of all the drinking locations 19 are arranged centrally at a distance beneath the drinking valves 21. In the exemplary embodiment shown, the water-collecting bowls 24 are connected releasably to the water-supply line 20 while being stationary and immovable. Furthermore, according to the invention, each drinking valve 21 is assigned an actuating means which is designed as a tubular actuating lever 25 or as a rod-like actuating lever 50. The actuating lever 25, relative to the respective water-collecting bowl 24, is mounted pivotably on or in the region of the water-supply line 20 and, in a top region, is coupled to the actuating end 23 of the valve pin of each drinking valve 21. The actuating lever 50 is connected to the actuating end 23 of the valve pin. The actuating levers 25 and 50 are guided from the respective drinking valve 21 into the water-collecting bowl 24 and thus, in practice, extend the actuating end 23 of each valve pin into the region of the water-collecting bowl 24. By virtue of the fixed arrangement of each water-collecting bowl 24 to the water-supply line 20 only the actuating lever 25 can be pivoted, but not its respectively assigned water-collecting bowl 24.

Figure 6:
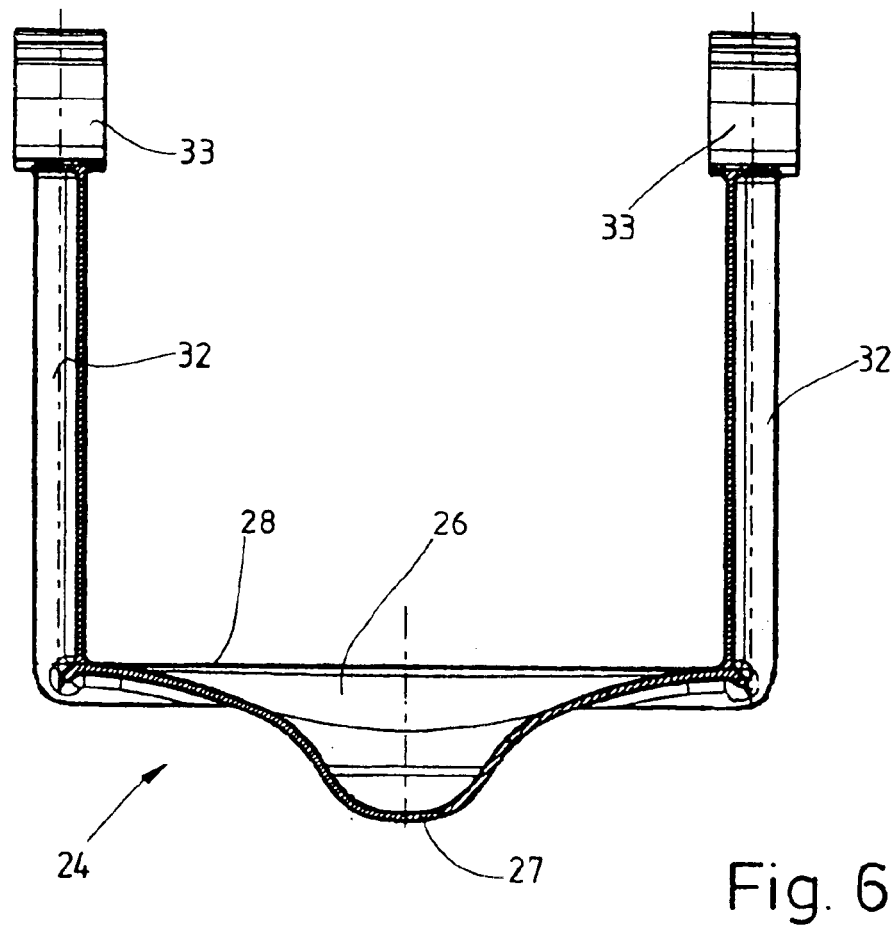
FIG. 6 shows a side view of a water-collecting bowl which serves for breeding purposes (up to six weeks), with a section through the center of the water-accommodating hollow.
Figure 7:
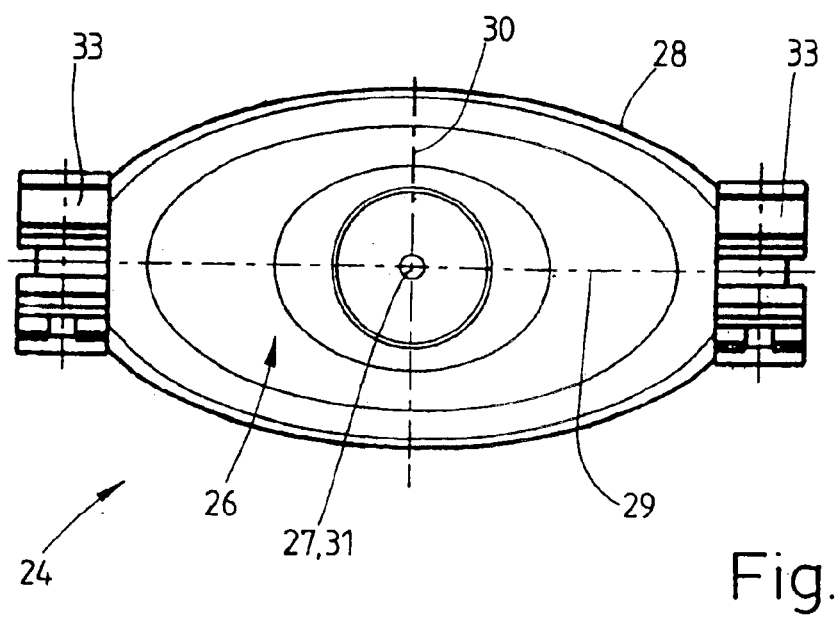
FIG. 7 shows a plan view of the water-collecting bowl in FIG. 5.
Figure 8:
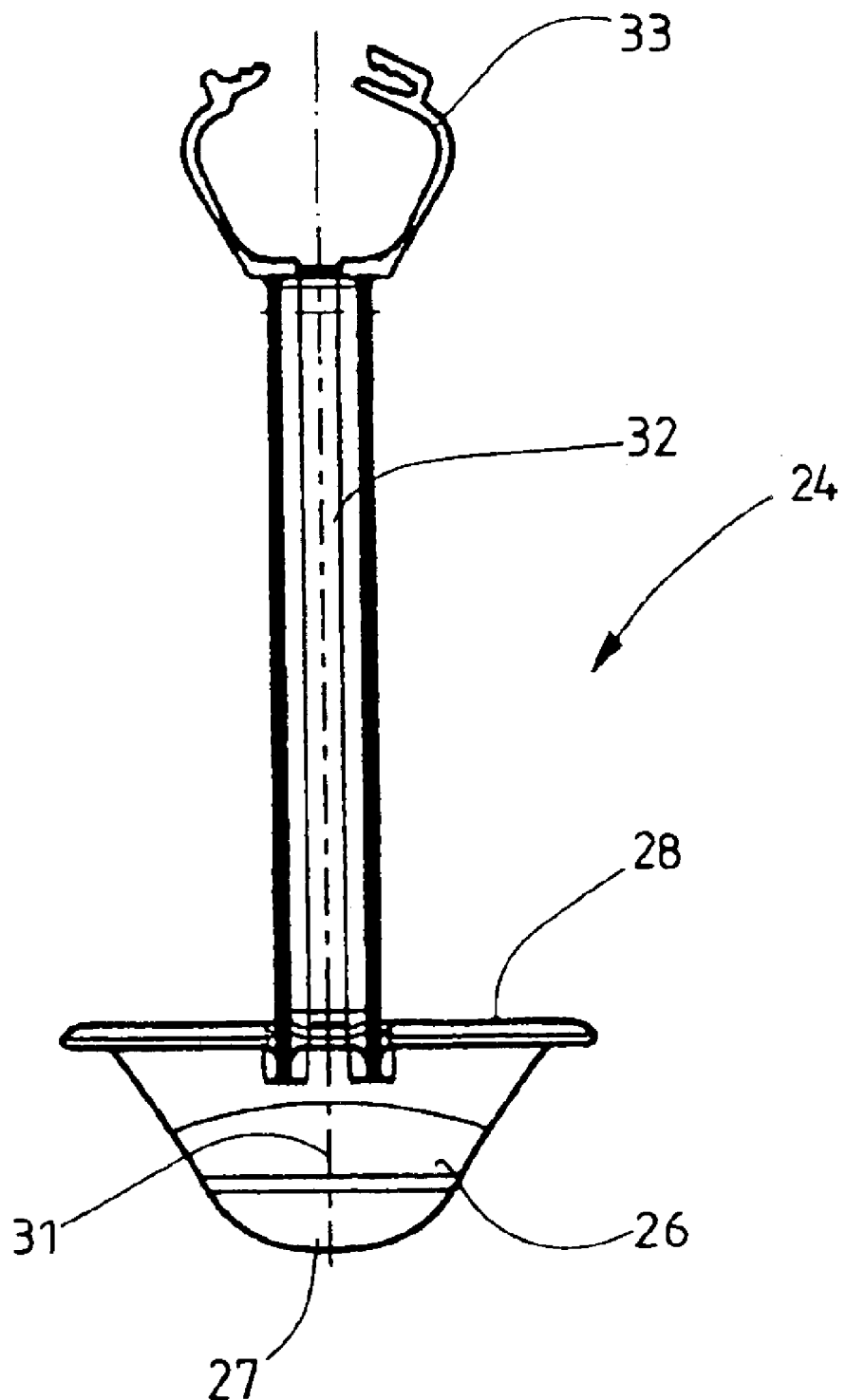
FIG. 8 shows a side view of the water-collecting bowl of FIGS. 5 and 6.

According to the invention, the water-collecting bowl 24 which is illustrated in detail in FIGS. 6 to 8 is designed particularly for supplying water to small, young animals, to be precise in particular the breeding of turkey chicks. Supplying water automatically to turkey chicks by drinking troughs of the type described here has proven very problematic up until now because the turkey chicks are timid and are not quick to learn. The specific configuration of the water-collecting bowl 24, to be precise in particular the water-accommodating hollow 26 of the same which serves for accommodating a water supply, has proven practicable even for supplying water automatically to turkey chicks in particular.

The water-accommodating hollow 26 of the water-collecting bowl 24 shown here has an elongate, boat-like configuration. For this purpose, the cross-sectional configuration of the water-accommodating hollow 26 changes, to be precise preferably continuously, from the lowest location 27 in the base region up to the top border 28. A bottom part of the water-accommodating hollow 26 extending from the lowest location 27 is provided with a circular cross section. This circular cross section changes continuously, in the direction of the top border 28, into an elliptical (or also oval) cross section. In this case, the ratio of the longer axis 29 to the shorter axis 30 of the elliptical cross section increases in the direction of the top border 28, that is to say the elliptic cross-sectional configuration of the water-accommodating hollow 26 becomes continuously more pronounced in the direction of the top border 28. The change in cross-sectional configurations of the water-accommodating hollow 26 results in not just the size but also the shape of the water surface of the drinking water located in the water-accommodating hollow 26 changing as the water level rises in the direction of the border 28. In particular the volume of the water in the water-accommodating hollow 26 increases disproportionately as the water level rises. At a low water level, there is only a comparatively small quantity of water still remaining in the water-accommodating hollow 26. This quantity of residual water takes up the bottom, circular part of the water-accommodating hollow 26, with the result that, at a low water level in the water-collecting bowl 24, the surface of the water-accommodating hollow 26 is circular and only extends at a small distance from the vertical longitudinal center axis 31 of the water-accommodating hollow 26, said longitudinal center axis extending the longitudinal center axis of the respective drinking valve 19 in the downward direction. If the water-accommodating hollow 26, in contrast, is filled with water more or less up to the border 28, the water surface has an elongate, elliptical configuration. The area of this water surface is greater, by a multiple, than the circular water surface area in the vicinity of the lowest location 27 of the water-accommodating hollow 26 (FIG. 7). In this way, the water volume in the water-accommodating hollow 26, with double the water level, is considerably more than double the size.

The water-collecting bowl 24 has two parallel supporting arms 32 at opposite, narrow end regions of the elliptic border 28 of the water-accommodating hollow 26. The supporting arms 32, which are of identical design, extend vertically in the direction of the water-supply line 20. The top ends of the supporting arms 32 are each provided with a clip closure 33. The clip closures 33, which are of identical design, serve for connecting the water-collecting bowl 24 releasably to the water-supply line 20 via the supporting arms 32. In the closed state, the clip closures 33 engage all the way round the water-supply line 20.

The entire water-collecting bowl 24 is formed in one piece from plastic, to be precise preferably a thermoplastic material. The water-collecting bowl 24 is dark in color, in particular dark blue. Such a color does not contrast with the bedding (for example shavings) in the poultry house, as a result of which the water-collecting bowl is not obvious, in particular, to young turkey chicks and thus does not form an enticement.

By virtue of the supporting arms 32 being arranged at the narrow end regions of the water-accommodating hollow 26, the long axis 29 of the latter is oriented longitudinally in relation to the water-supply line 20, with the result that, with the water-collecting bowl 24 fastened rigidly, i.e. non-pivotably, beneath the water-supply line 20, the elongate water-accommodating hollow 26 extends in the direction of the water-supply line 20. The longer axis 29 of the water-accommodating hollow 26 is preferably located vertically beneath the longitudinal center axis of the water-supply line 20, the plane of the border 28 of the water-accommodating hollow 26 running parallel to the longitudinal axis of the water-supply line 20. In the case of the usually horizontally directed water-supply line 20, the plane defined by the border 28 of the water-accommodating hollow 26 is thus also located in a horizontal.

The actuating lever 25, which is formed entirely from plastic, to be precise in particular thermoplastic material, has a top articulation part 34 and a tube 35 arranged thereunder. The articulation part 34 and the tube 35 are connected integrally to one another. The actuating lever 25 is connected to the water-supply line 20 by way of the articulation part 34 such that it can be moved about a horizontal pivot pin 36. The pivot pin 36 runs transversely to the longitudinal axis of the water-supply line 20. Moreover, the pivot pin 36 runs transversely through the vertical longitudinal center axis of the drinking valve 21 of each drinking location 19. In the exemplary embodiment shown, the pivot pin 36 is located some way beneath the longitudinal center axis of the water-supply line 20, to be precise approximately level with an underside of water-supply line 20. In this way, the actuating lever 25 can only be pivoted, to be precise in opposite directions, in a vertical plane extending centrally through the water-supply line 20. In other directions, the actuating lever 25 is essentially immovable.

The articulation part 34 of the actuating lever 25 is of fork-like design with an essentially U-shaped cross section. Two parallel, upright legs 37 of the articulation part 34 are located on opposite sides of the water-supply line 20. Each of these legs 37 has a through-passage bore 38. The through-passage bores 38 of the two legs 27 are located on a common axis which corresponds to the pivot pin 36.

In the exemplary embodiment shown, a fastening part 39 is provided in the region of the respective drinking valve 21, said fastening part enclosing the water-supply line 20 in a clamp-like manner and being releasable from the water-supply line 20, if required, by a clip closure 40. The fastening part 39 has journals 41 which project on opposite sides and, like the through-passage bores 38 of the articulation part 34 of the actuating lever 25, are located on the pivot pin 36. The through-passage bores 38 are designed to correspond to the journals 41 such that the journals 41 engage in the respective through-passage bore 38 at least in part from one side, and a connection of the actuating lever 25 to the fastening part 39 and, via the latter, to the water-supply line 20 is thus produced. Furthermore, the through-passage bores 38 and the journals 41 are dimensioned such that they allow easy, constraint-free pivoting of the actuating lever 25. By virtue of the legs 37 being designed in an elastic manner, the journals 41 of the fastening part 39 can be connected to the through-passage bores 38 of the articulation part 34, and disconnected therefrom, by latching. This creates a releasable articulated connection between the actuating lever 25 and the water-supply line 20 or the fastening part 39, and this connection allows the actuating lever 25 to be fitted and removed quickly and easily.

The articulation part 34 and the tube 35 are connected in the region of a crosspiece 42 between the legs 37 of the articulation part 34. The crosspiece 42 has a central through-passage bore 43, which leaves the top end of the tube 35 open for the through-flow of water. The actuating lever 25 is coupled to the actuating end 23 of the valve pin of the drinking valve 21 in the region of the through-passage bore 43 of the crosspiece 42. For this purpose, certain regions of the through-passage bore 43 in the crosspiece 42 are provided with, for example, radially directed ribs 44 (only one rib 44 is shown, for illustrative reasons, in FIG. 3). By means of at least three such ribs 44 arranged in the form of a star, the actuating lever 25 is coupled in a more or less form-fitting manner to the actuating end 23 of the drinking valve 21. In the case of the actuating lever 25 being pivoted, the actuating end 23 is thus pivoted along with it and the drinking valve 21 is opened as a result. The drinking valve 21 remains open until the actuating lever 25 is pivoted (chain-dotted illustration in FIG. 2). Once the actuating lever 25 is released, it returns automatically, as a result of gravitational force, into its vertical starting position (FIG. 2), as a result of which the drinking valve 21 passes into its closed position again. Free spaces remaining between the ribs 44 of the through-passage bore 43 in the crosspiece 42 ensure, when the drinking valve 21 is open, that the water flowing out of the latter flows through the tube 35 to the stationary water-collecting bowl 24.

Figure 2:
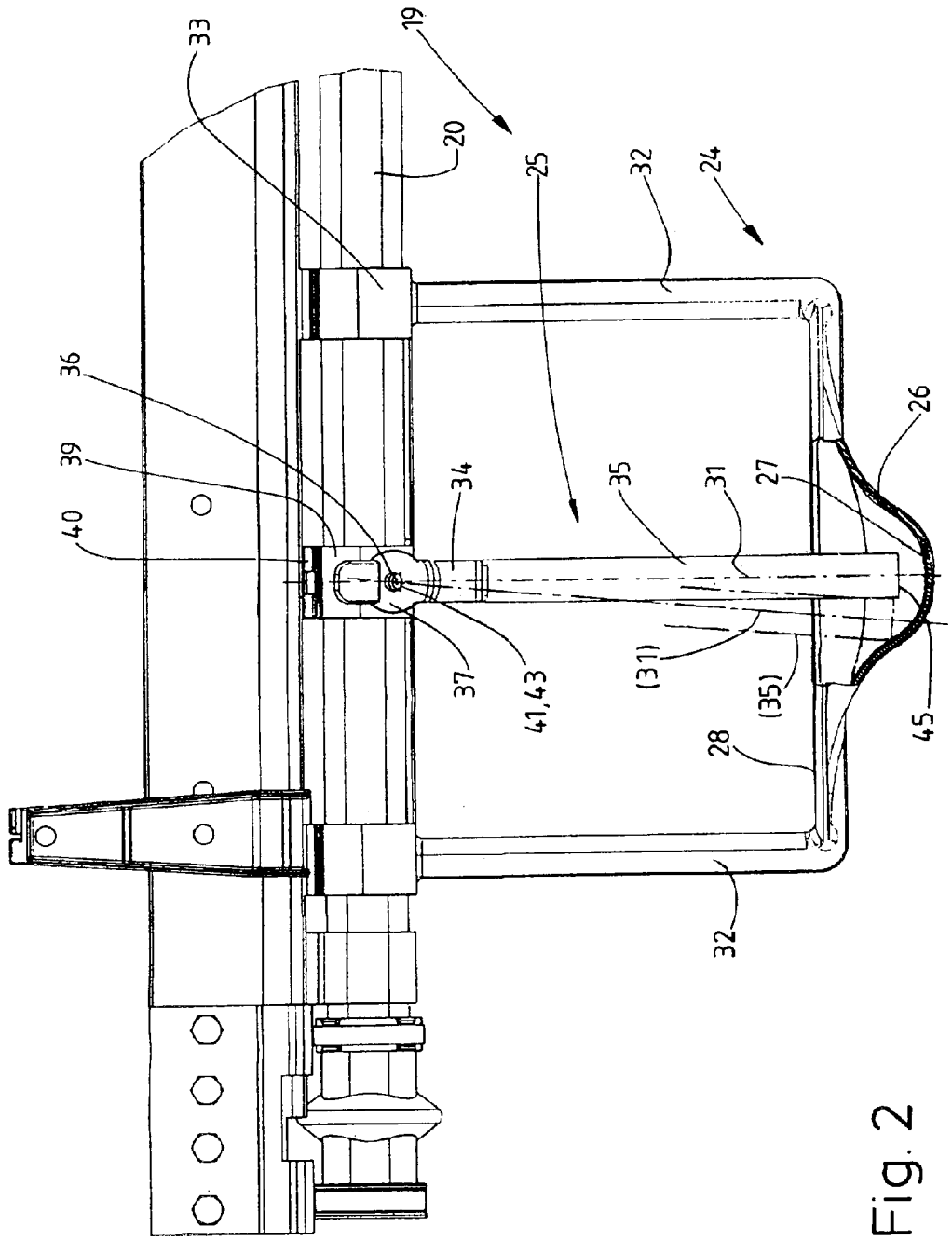
FIG. 2 shows an enlarged detail II of the drinking trough from FIG. 1 in a partial section.
Figure 3:
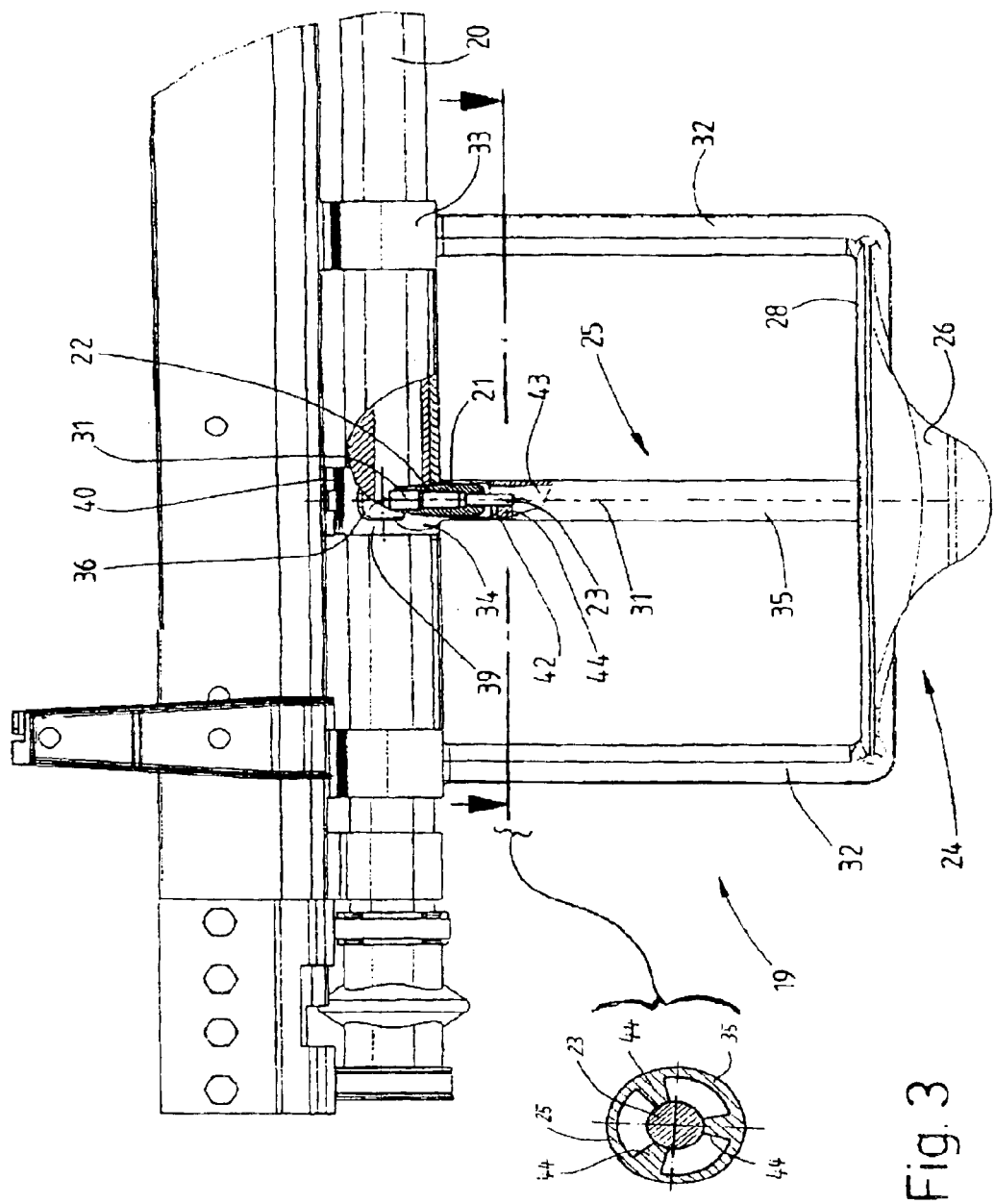
FIG. 3 shows an illustration of the drinking trough analogous to FIG. 2 in another partial section.
Figure 4:
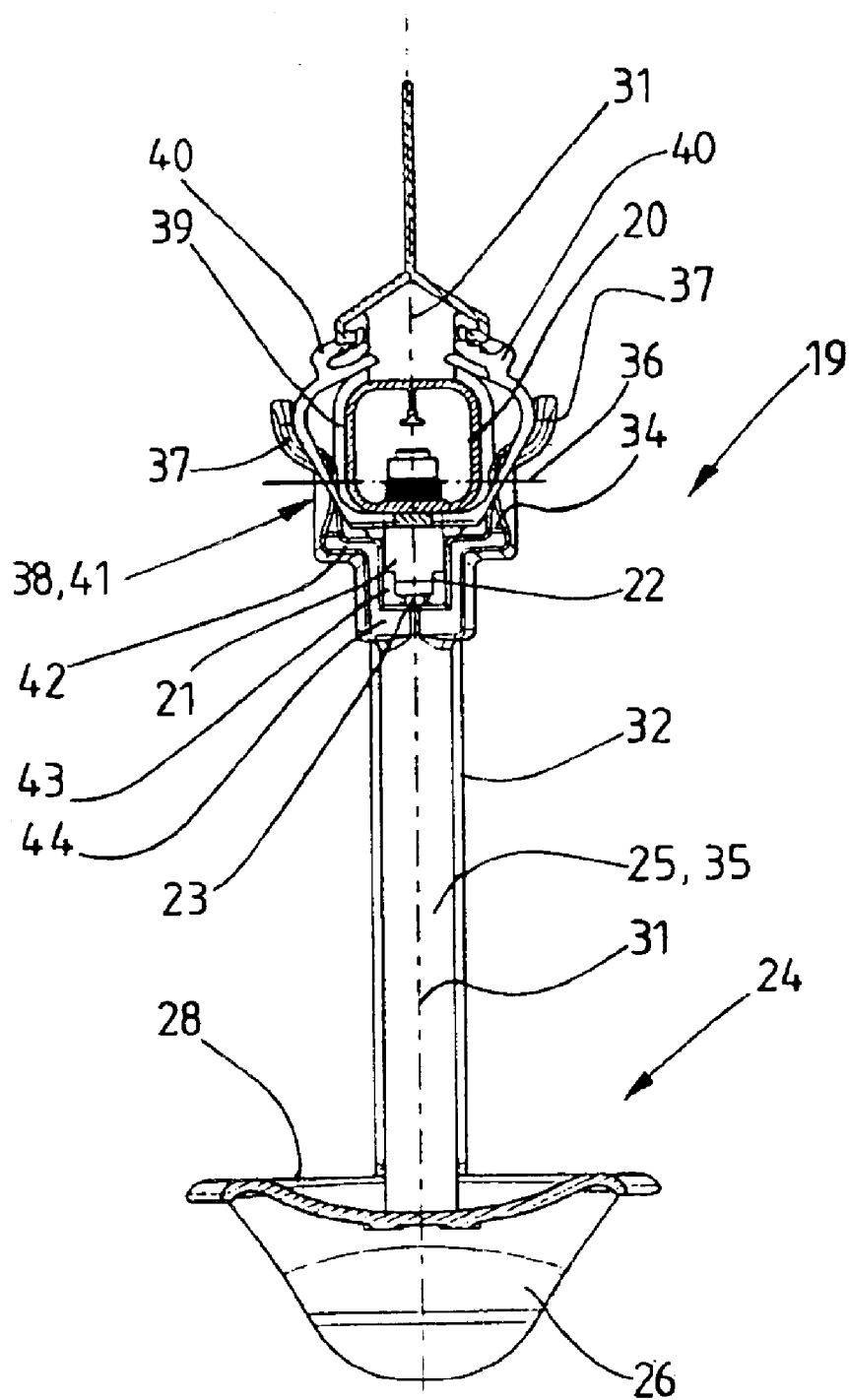
FIG. 4 shows a cross section through the drinking trough of FIG. 1.

The length of the actuating lever 25, in particular of the tube 35, is such that an open, bottom end 45 of the tube 35 ends at a small distance above the lowest location 27 on the base of the water-accommodating hollow 26 (FIG. 2). This distance is preferably selected such that it is only possible for the actuating lever 25 to be pivoted to a certain extent (pivoting angle) with respect to the non-pivotable water-collecting bowl 24. This makes it possible, via the corresponding design of the water-accommodating hollow 26 of the water-collecting bowl 24 and its stationary arrangement below the water-supply line 20, to limit the quantity of water discharged by the drinking valve 21. Commercially available drinking valves 21 with a large water through-flow rate which covers the water requirement of larger animals may thus be used for breeding young animals, in particular turkey chicks, without any risk of the water-collecting bowl 24 overflowing.

The color of the actuating lever 25 preferably differs from, and is lighter than, that of the water-collecting bowl 24. For example, the actuating lever 25 may be yellow. The yellow color, in particular if a signal yellow is used, has a certain enticing effect for the animals, which results in newly housed, inexperienced chicks, in particular turkey chicks, being able to open the respective drinking valve 21 more or less playfully when they touch the actuating lever 25 out of curiosity, said actuating lever, on account of its smooth operation, thus opening the drinking valve 21.

Figure 5:
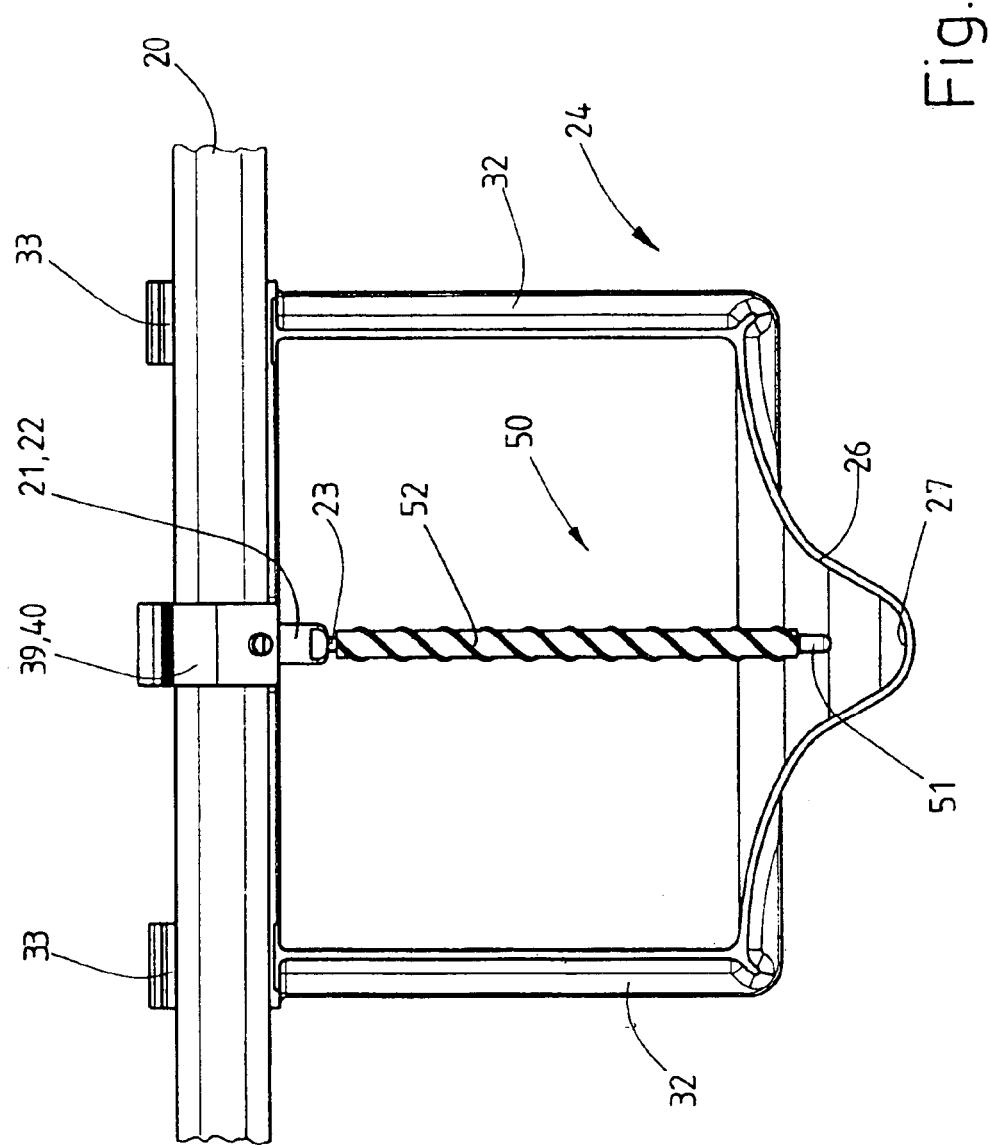
FIG. 5 shows an alternative drinking trough with a rod-like actuating means in a view analogous to FIG. 2.

FIG. 5 shows the actuating lever 50 according to an alternative exemplary embodiment of the invention. The actuating lever 50 is of rod-like design, that is to say, in contrast to the actuating lever 25, is not hollow. The actuating lever 50 is merely fastened at the actuating end 23 of the valve pin, said actuating end projecting out of the housing 22 of the drinking valve 21. This fastening takes place by a blind bore being located in the top end side of the fastening lever 50 and it being possible for the bottom region of the actuating end 23 to be pushed, with prestressing, into said blind bore. This produces a releasable, but otherwise fixed, connection between the actuating lever 50 and the actuating end 23. The result is that, when the actuating lever 50 is pivoted, the actuating end 23 of the valve pin is pivoted at the same time and the drinking valve 21 is thus opened. The length of the actuating lever 50 is such that the latter ends, by way of a free (bottom) end 51, at a small distance above the lowest location 27 on the base of the non-pivotable water-accommodating hollow 26 (FIG. 5). The actuating lever 50 can be moved all the way round, that is to say it can be pivoted as desired in all directions. In this case, the pivoting angle of the actuating lever 50 is limited by a stop of the bottom free end 51 on the stationary water-accommodating hollow 26 of the water-collecting bowl 24 attached below the water-supply line 20.

The actuating lever 50 is preferably formed from plastic, to be precise as a solid plastic part. It is also conceivable, however, for the actuating lever 50 to be formed from steel, in particular stainless steel. The actuating lever 50 is preferably also provided with a striking color, preferably yellow or signal yellow. The actuating lever 50 thus also has an enticing effect on the animals, to be precise in particular young turkeys, which are thus encouraged to actuate the drinking valve 21.

If the drinking valve 21 has been opened by virtue of the actuating lever 50 being pivoted, the water passing out of the drinking valve 21 at the bottom flows along the outside of the actuating lever 50 into the water-accommodating hollow 26 of the water-collecting bowl 24 which is immovable relative to the actuating lever 50. In this case, the water adheres by adhesion to the outer lateral surface of the actuating lever 50, with the result that all the water passes into the water-collecting bowl 24 and does not splash round about. The actuating lever 50 shown in FIG. 5 has an encircling helix 52 on its outer, cylindrical lateral surface. The helix 52 projects outwards in relation to the otherwise smooth lateral surface of the actuating lever 50. By way of the helix 52, the water is guided along the actuating lever 50 from top to bottom and thus directed reliably into the water-collecting bowl 24.

The water flowing along the outside of the actuating lever 50 continuously cleans the actuating lever 50, with the result that the drinking trough shown in FIG. 5 fulfils particularly stringent hygiene requirements.

Figure 9:
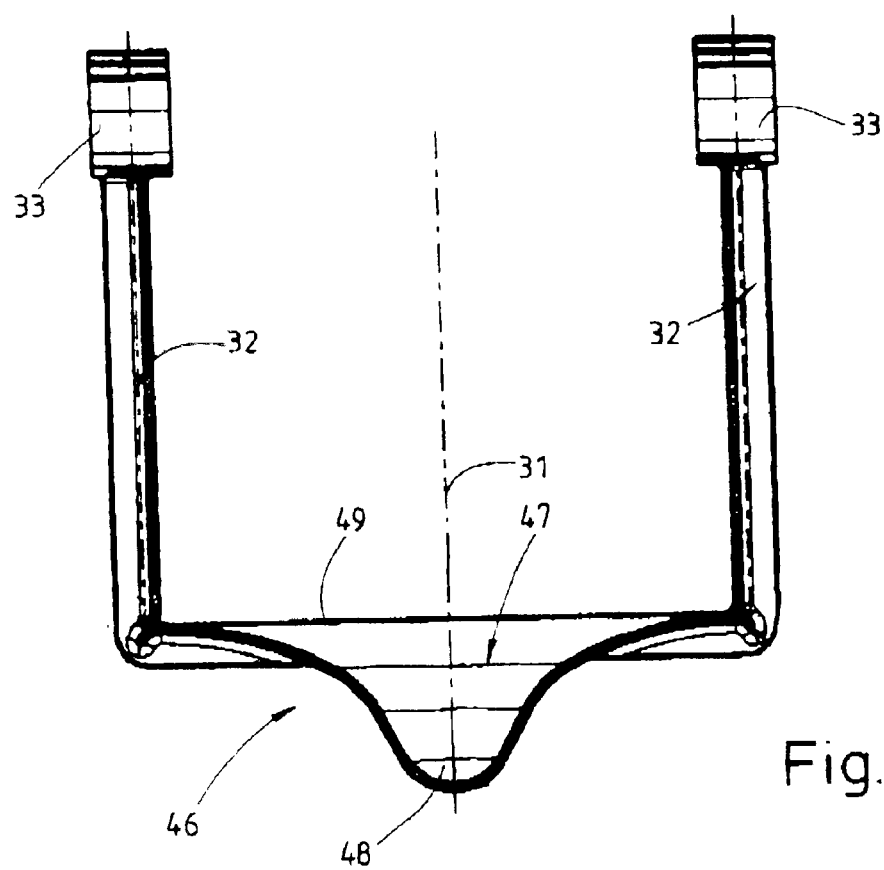
FIG. 9 shows a side view of a water-collecting bowl which is provided for fattening purposes and has a greater water-accommodating capacity.
Figure 10:
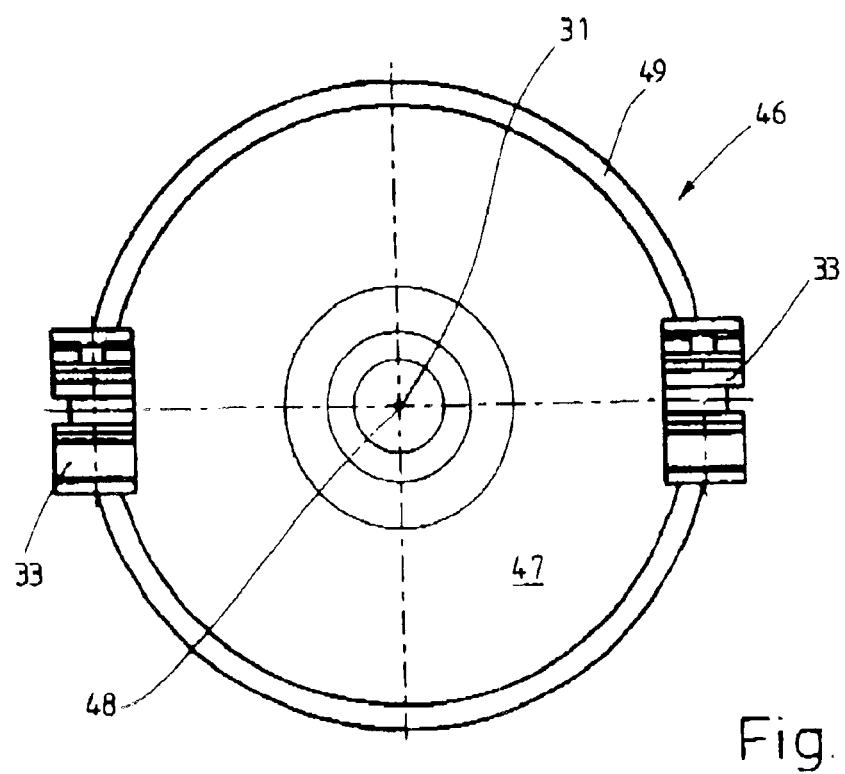
FIG. 10 shows a plan view of the water-collecting bowl in FIG. 9.
Figure 11:
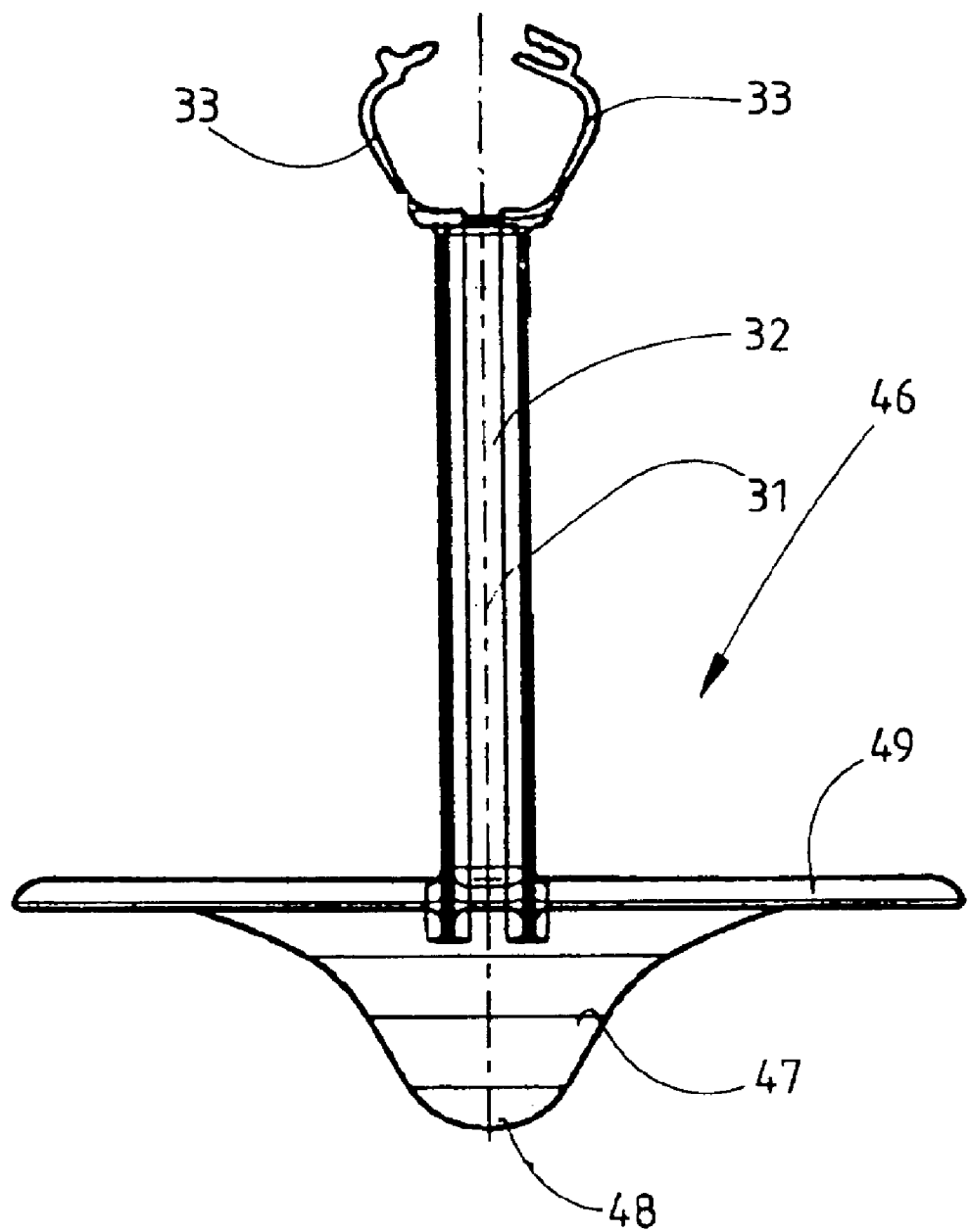
FIG. 11 shows a side view of the water-collecting bowl of FIGS. 8 and 9.

FIGS. 9 to 11 show a water-collecting bowl 46 which is provided for fattening purposes, and differs from the water-collecting bowl 24 in the design of the water-accommodating hollow 26. The supporting arms 32 are designed as for the water-collecting bowl 24, and in particular are spaced apart by the same distances and have the same clip closures 33, with the result that the water-collecting bowl 46 can be fitted at the same location of the water-supply line 20 used for fastening the water-collecting bowl 24.

Starting from the lowest location 48 up to the top border 49, the water-accommodating hollow 47 of the water-collecting bowl 46 has the same cross-sectional configuration. In the exemplary embodiment shown, the water-accommodating hollow 47 has circular cross sections over the entire height. All that changes, in the direction of the border 49, is the diameter of the water-accommodating hollow 47, which increases. However, the diameter increases disproportionately to the depth of the water-accommodating hollow 47, to be precise such that the diameter increases more quickly in the direction of the top border 49. On account of the circular cross-sectional configuration throughout, the water-collecting bowl 46 has a greater water-accommodating capacity than the water-collecting bowl 24. The water-collecting bowl 46 is thus particularly suitable for older animals which require more water.

The lowest location 48 of the water-accommodating hollow 47 of the water-collecting bowl 46 may be spaced apart from the water-supply line 20 by a greater distance than the lowest location 27 of the water-collecting bowl 24. This means that the bottom end 45 of the tube 35 of the actuating lever 25 is spaced apart by a greater distance from the lowest location 48 of the water-accommodating hollow 47 than is the case for the water-collecting bowl 24. On account of this, the actuating lever 25 can be pivoted through a larger angle, as a result of which a larger quantity of water is discharged by the respective drinking valve 21 per unit of time without the drinking valve 21 having to be exchanged for this purpose.

The two different water-collecting bowls 24 and 46 allow straightforward conversion of the drinking trough. Such conversion takes place, for example, for housing young animals, namely chicks. In this case, the drinking trough is provided with actuating levers 25 and boat-like water-collecting bowls 24. In a fattening phase of the animals, following the breeding phase, allowances are made according to the invention for the then increasing water requirement of the animals in that the water-collecting bowls 24 with a smaller water-accommodating capacity are exchanged for water-collecting bowls 46 with a greater water capacity. For this purpose, merely the clip closures 33 on the supporting arms 32 of the water-collecting bowls 24 are opened and the water-collecting bowls 24 are separated from the water-supply line 20. The water-collecting bowls 46 are then fastened on the water-supply line 20 at the same locations. Conversely, following the fattening phase, the smaller water-collecting bowls 24 may be fitted on the water-supply line again.

In order that, on account of the increase in the amount of water required by the larger animals, a correspondingly larger quantity of water can pass out of the drinking valves 21, the water-collecting bowls 46 are dimensioned such that they allow the actuating levers 25 or 50 to be pivoted further, as a result of which the drinking valves 21 can be opened further and a larger quantity of water can be discharged per unit of time.

It is conceivable, for the purpose of further increasing the amount of water required by the animals, for the purpose of reducing aggression and because a fair number of animals, for example, prefer to drink directly from drinking valves, to remove at least some of the actuating levers 25 and/or 50 by releasing their latching connections from the fastening part 39 on the water-supply line 20 or from the actuating end 23 of the valve pin. The drinking trough illustrated in FIG. 1 is preferably modified such that every second actuating lever 25 is removed. Larger animals can then open the drinking valves 21 directly at the actuating ends 23 of the valve pins. It is possible here for the animals to tilt the valve pin to the maximum extent and, in the case of corresponding drinking valves 21 being present, even to raise the valve pins, as a result of which the largest possible quantity of water can flow out of the drinking valve 21 per unit of time.

LIST OF DESIGNATIONS

19 Drinking location
20 Water-supply line
21 Drinking valve
22 Housing
23 Actuating end
24 Water-collecting bowl
25 Actuating lever
26 Water-accommodating hollow
27 Lowest location
28 Border
29 Longer axis
30 Shorter axis
31 Longitudinal centre axis
32 Supporting arm
33 Clip closure
34 Articulation part
35 Tube
36 Pivot pin
37 Leg
38 Through-passage bore
39 Fastening part
40 Clip closure
41 Journal
42 Crosspiece
43 Through-passage bore
44 Rib
45 Bottom end
46 Water-collecting bowl
47 Water-accommodating hollow
48 Lowest location
49 Border
50 Actuating lever
51 Free end
52 Helix

What is claimed is:

1. Drinking trough for poultry having a drinking valve (21) assigned to a water-supply line (20), a valve pin that is moved to discharge water from the water-supply line, an actuating means, and a water-collecting bowl (24, 46) assigned to the drinking valve (21), characterized in that:

a) the actuating means is an actuating lever (25) consisting essentially of an elongated tube (35) having two ends, a top end of which is proximal to the valve pin and a lower end of which extends into a water-accommodating hollow of the water-collecting bowl (24, 46), and the valve pin is a pivot pin (36) comprising an actuating end (23);

b) the actuating lever (25) is connected to the water supply line (20) by way of a fastening part (39) comprising the pivot pin (36), which runs transversely through a longitudinal center axis of the drinking valve (21); and c) the actuating lever (25) is operatively coupled to the actuating end (23) proximal to the top end of the elongated tube (35);

wherein the actuating lever (25) is assigned to the valve pin and is pivotable relative to the drinking valve (21) and pivotable around a longitudinal axis of the pivot pin (36), whereby a pivoting movement of the actuating means actuates the valve pin by moving the valve pin to a position at which water is discharged from the respective drinking valve (21), through the elongated tube (35) of the actuating lever (25), and into the water-collecting bowl (24, 46).

2. Drinking trough according to claim 1, characterized in that water-supply line (20) runs horizontally and has a horizontal axis and the pivot pin (36) is approximately horizontal to, and runs transversely to, the longitudinal axis of the water-supply line (20).

3. Drinking trough according to claim 1, characterized in that a top end region of the actuating means is assigned to an actuating end (23) of the valve pin, said actuating end projecting out of a housing (22) of the drinking valve (21), such that when the actuating means (25) is pivoted, the valve pin is pivoted to open the drinking valve (21).

4. Drinking trough according to claim 1, characterized in that the actuating lever (25) is releasably coupled to the actuating end (23) of the valve pin of the drinking valve (21) in the region of a top end of the tube (35).

5. Drinking trough according to claim 1, characterized in that the actuating lever (25) is mounted on the water-supply line (20) so that the actuating lever can be tilted about a pivot pin (36) in such a manner that the actuating lever returns automatically to an initial rest position in which the valve pin is non-actuated and the respective drinking valve (21) is closed.

* * * * *

UNITED STATES PATENT AND TRADEMARK OFFICE
CERTIFICATE OF CORRECTION

PATENT NO. : 6,938,578 B2
DATED : September 6, 2005
INVENTOR(S) : Schumacher

It is certified that error appears in the above-identified patent and that said Letters Patent is hereby corrected as shown below:

Title page,
Item [54], Title, replace with:
-- DRINKING TROUGH AND METHOD OF CONVERTING THE SAME --.

Signed and Sealed this

Fifteenth Day of November, 2005

JON W. DUDAS
*Director of the United States Patent and Trademark Office*